United States Patent
Kim et al.

(10) Patent No.: US 9,064,148 B2
(45) Date of Patent: Jun. 23, 2015

(54) APPARATUS AND METHOD FOR RECEIVING UNMANNED MAIL

(71) Applicant: Electronics and Telecommunications Research Institute, Daejeon (KR)

(72) Inventors: Young Won Kim, Daejeon (KR); Jae Gwan Song, Daejeon (KR); Dong Gil Na, Daejeon (KR); Hoon Jung, Daejeon (KR); Yong Hoon Choi, Daejeon (KR); Moon Sung Park, Daejeon (KR); Ji Young Choi, Daejeon (KR); Heon Gyu Lee, Daejeon (KR); Jin Hyoung Park, Cheongju-si (KR); Hee Chul Bae, Daejeon (KR); Hong Kyu Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 142 days.

(21) Appl. No.: 13/869,196

(22) Filed: Apr. 24, 2013

(65) Prior Publication Data

US 2014/0050351 A1 Feb. 20, 2014

(30) Foreign Application Priority Data

Aug. 14, 2012 (KR) .................. 10-2012-0088757

(51) Int. Cl.
*G06K 9/00* (2006.01)
*B07C 3/14* (2006.01)
*B07C 3/18* (2006.01)
*G07B 17/02* (2006.01)

(52) U.S. Cl.
CPC ........ *G06K 9/00442* (2013.01); *G06K 9/00892* (2013.01); *B07C 3/14* (2013.01); *B07C 3/18* (2013.01)

(58) Field of Classification Search
CPC ............... G06K 9/00; B07C 7/00; B07C 3/00
USPC .................................. 382/101; 705/406, 407
See application file for complete search history.

(56) References Cited

U.S. PATENT DOCUMENTS

| 6,917,924 B1* | 7/2005 | Ramsden et al. ............. 705/407 |
| 2010/0100233 A1* | 4/2010 | Lu ................................ 700/226 |

FOREIGN PATENT DOCUMENTS

| KR | 10-2000-0025512 A | 5/2000 |
| KR | 10-2006-0067005 A | 6/2006 |

\* cited by examiner

*Primary Examiner* — Abolfazl Tabatabai
(74) *Attorney, Agent, or Firm* — LRK Patent Law Firm

(57) ABSTRACT

Provided is an apparatus for receiving an unmanned mail capable of automatically acquiring the address information even though the user does not directly input the address information. The apparatus acquires address information of an addressee by automatically recognizing the address of the mail when the address is written on the mail, and acquires the address information of the addressee through the paper on which the address is printed or written, identification, and biometric recognition when the address is not written on the mail. The apparatus may acquire the address information of the addressee through a mail sender's voice.

15 Claims, 6 Drawing Sheets

APPARATUS AND METHOD FOR RECEIVING UNMANNED MAIL

CROSS-REFERENCE TO RELATED APPLICATIONS

This application claims priority to and the benefit of Korean Patent Application No. 10-2012-0088757 filed in the Korean Intellectual Property office on Aug. 14, 2012, the entire contents of which are incorporated herein by reference.

TECHNICAL FIELD

The present invention relates to an apparatus and a method for receiving a mail. More particularly, the present invention relates to an apparatus and a method for receiving an unmanned mail.

BACKGROUND

Recently, in order to reduce labor and maintenance costs, a manned postal system has been switched into an unmanned system in various countries. Even in Korea, in the case of simple and repetitive postal work, the system switching undertaking is progressing on a trial basis in the farming and fishing areas or island areas so as to process the postal work by the unmanned system.

However, since most of aged people living in the farming and fishing areas or the island areas are not used to input information through a keyboard or touch screen method, it is difficult to send the mail by using the unmanned system. In the case of the unmanned system, a remote supporting can be performed by a call center, but when an addressee's address is not transferred to a counselor of the call center well, the mail may be incorrectly sent.

SUMMARY

The present invention has been made in an effort to provide an apparatus and a method for receiving an unmanned mail through a recognition function. The present invention has been made in an effort to provide an apparatus and a method for receiving an unmanned mail by recognizing an address written on a paper or receiving an unmanned mail based on an address selected after user recognition.

An exemplary embodiment of the present invention provides an apparatus for receiving an unmanned mail, including: a mail collecting unit configured to collect a mail; an address information acquiring unit configured to acquire address information from the collected mail; a user recognition unit configured to recognize a user who intends to receive the mail, when the address information is not included in the collected mail; an address information detecting unit configured to detect address information relating to the recognized user among the stored address information; and a mail receiving unit configured to receive the collected mail by an unmanned method by setting the selected address information or the acquired address information among the detected address information as address information of an addressee.

The address information acquiring unit may include a text area extraction unit configured to extract a text area from the collected mail; a data recognition unit configured to recognize data included in the extracted text area; and a data combining unit configured to acquire the address information by combining the recognized data.

The user recognition unit may include an identification-based recognition unit which includes an identification scanning unit scanning the identification held by the user, and recognizes the user based on information acquired by scanning the identification; a fingerprint-based recognition unit which recognizes the user based on information acquired by scanning a user's fingerprint; and an iris-based recognition unit which recognizes the user based on information acquired by scanning a user's iris.

The user recognition unit may further include an identification requesting unit configured to request the user to input the identification into the identification scanning unit or to position the identification on a screen of the identification scanning unit; an identification recognition controller configured to perform a control to recognize the user by using the identification when the identification is input into the identification scanning unit or positioned on the screen for a predetermined stand-by time; and a fingerprint/iris recognition controller configured to perform a control to recognize the user by using the fingerprint or the iris when the identification is not input into the identification scanning unit or positioned on the screen for the stand-by time.

The fingerprint/iris recognition controller may perform a control to recognize the user by using the iris when the number of times attempting to recognize the user using the fingerprint exceeds a reference value.

The address information detecting unit may retrieve whether a person registered as a family of the recognized user exists and additionally detect address information relating to the retrieved person when the retrieved person exists.

The apparatus for receiving an unmanned mail may further include an address information display unit configured to display the detected address information and display the detected address information according to a use frequency.

The apparatus for receiving an unmanned mail may further include a first address information registering unit which includes a paper scanning unit scanning a paper held by the user and registers information acquired by scanning data printed or written on the paper as address information relating to the user; or a second address information registering unit which includes a voice recognition unit recognizing a voice of the user and registers information acquired by recognizing the voice as the address information relating to the user, in which the mail receiving unit may receive the collected mail by an unmanned method by setting the registered address information as the address information of the addressee.

The mail receiving unit may receive the collected mail by an unmanned method by printing the address information of the addressee on a label and attaching the label to the collected mail.

Another exemplary embodiment of the present invention provides a method for receiving an unmanned mail, including: a mail collecting step of collecting a mail; an address information acquiring step of acquiring address information from the collected mail when the address information is included in the collected mail; a user recognition step of recognizing a user who intends to receive the mail, when the address information is not included in the collected mail; an address information detecting step of detecting address information relating to the recognized user among the stored address information; and a mail receiving step of receiving the collected mail by an unmanned method by setting the selected address information or the acquired address information among the detected address information as address information of an addressee.

The address information acquiring step may include a text area extracting step of extracting a text area from the collected mail; a data recognition step of recognizing data included in the extracted text area; and a data combining step of acquiring the address information by combining the recognized data.

The user recognition step may recognize the user based on the information acquired by scanning the identification held by the user, or recognize the user based on information acquired by scanning the user's fingerprint or iris.

The user recognition step may include an identification requesting step of requesting the user to input the identification held by the user into the identification a scanning unit or to position the identification on a screen of the identification scanning unit; an identification recognition step of recognizing the user by using the identification when the identification is input into the identification scanning unit or positioned on the screen for a predetermined stand-by time; and a fingerprint/iris recognition step of recognizing the user by using the fingerprint or the iris of the user when the identification is not input into the identification scanning unit or positioned on the screen for the stand-by time.

The fingerprint/iris recognition step may recognize the user by using the iris when the number of times attempting to recognize the user using the fingerprint exceeds a reference value.

The address information detecting step may retrieve whether a person registered as a family of the recognized user exists and additionally detect address information relating to the retrieved person when the retrieved person exists.

The method for receiving an unmanned mail may further include an address information display step of displaying the detected address information and displaying the detected address information according to a use frequency, between the address information detecting step and the mail receiving step.

The method for receiving an unmanned mail may further include an address information registering step of registering information acquired by scanning data printed or written on a paper held by the user as address information relating to the user or registering information acquired by recognizing a voice of the user as the address information relating to the user, between the mail collecting step and the mail receiving step, in which the mail receiving step may receive the collected mail by an unmanned method by setting the registered address information as the address information of the addressee.

The mail receiving step may receive the collected mail by an unmanned method by printing the address information of the addressee on a label and attaching the label to the collected mail.

The present invention may have the following effects by providing an apparatus and a method for receiving an unmanned mail by recognizing an address written on a paper or receiving an unmanned mail based on an address selected after user recognition.

First, it is possible to solve inconvenience or inputting information through a keyboard or a touch screen, and to allow aged people to easily send a mail in an unmanned system. Second, it is possible to prevent a mail from being incorrectly sent. Third, it is possible to shorten a time taken to receive a mail.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
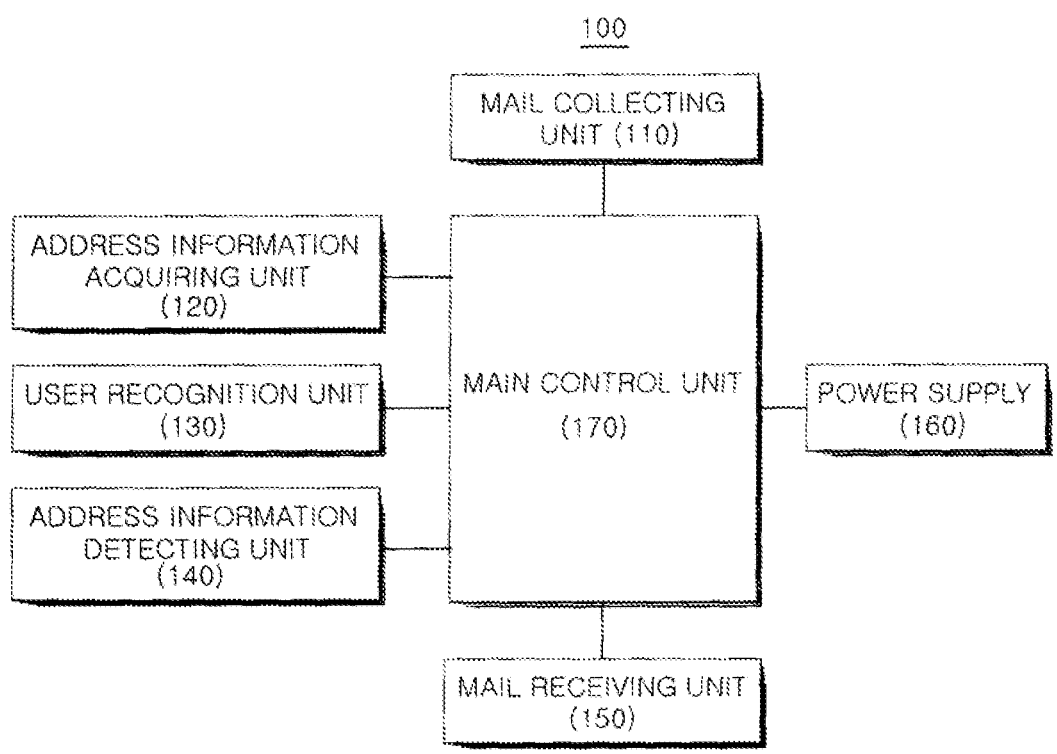
FIG. 1 is a block diagram schematically illustrating an internal configuration of an apparatus of receiving an unmanned mail according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

In the specification, in adding reference numerals to components throughout the drawings, it should be noted that like reference numerals designate like components even though components are shown in different drawings. In describing the present invention, well-known functions or constructions will not be described in detail since they may unnecessarily obscure the understanding of the present disclosure. Hereinafter, the exemplary embodiment of the present invention will be described, but it will be understood to those skilled in the art that the spirit and scope of the present invention are not limited thereto and various modifications and changes can be made.

Provided is an apparatus for receiving an unmanned mail capable of automatically acquiring the address information even though the user does not directly input the address information. The apparatus provided in the present invention acquires address information of an addressee by automatically recognizing the address of the mail when the address is written on the mail, and acquires the address information of the addressee through the paper on which the address is printed or written, identification, and biometric recognition when the address is not written on the mail. The apparatus may acquire the address information of the addressee through a mail sender's voice. The apparatus retrieves an address DB for each user and outputs the addresses which are used frequently on a screen to allow the mail sender to select the address. The address DB for each user may pre-store the addresses according to a request of a user or a protector, or may store the corresponding address when the mail sender uses the apparatus.

FIG. 1 is a block diagram schematically illustrating an internal configuration of an apparatus of receiving an unmanned mail according to an exemplary embodiment of the present invention. Referring to FIG. 1, an apparatus 100 for receiving an unmanned mail includes a mail collecting unit 110, an address information acquiring unit 120, a user recognition unit 130, an address information detecting unit 140, a mail receiving unit 150, a power supply unit 160, and a main control unit 170.

The apparatus 100 for receiving an unmanned, as an apparatus for receiving an unmanned mail through a recognition function, is an apparatus for supporting to easily input reception information including address information of an addressee by rapidly inquiring stored information based on personal information recognition. Aged people living in farming and fishing communities often send mails to their families living in urban areas, and as a result, the apparatus 100 for receiving an unmanned mail in which an address DB for each personal customer is constructed may have very high availability.

The mail collecting unit 110 serves to collect the mail.

The address information acquiring unit 120 serves to acquire address information from the collected mail when the collected mail has the address information. In this case, the apparatus 100 for receiving an unmanned mail may further include an address information determining unit (not illustrated) determining whether the address information is included in the collected mail.

Figure 2:
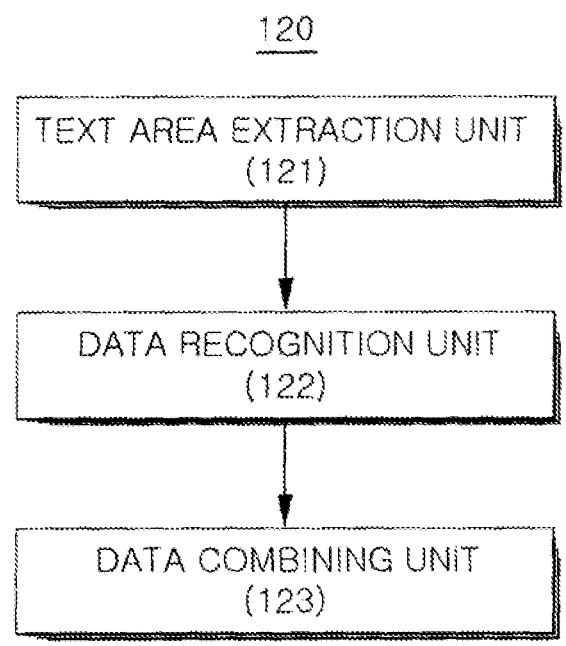
FIG. 2 is a block diagram illustrating an internal configuration of an address information acquiring unit illustrated in FIG. 1 in detail.

FIG. 2 is a block diagram illustrating an internal configuration of an address information acquiring unit illustrated in FIG. 1 in detail. Referring to FIG. 2, the address information acquiring unit 120 may include a text area extraction unit 121, a data recognition unit 122, and a data combining unit 123.

The text area extraction unit 121 serves to extract a text area from the collected mail.

The data recognition unit 122 serves to recognize data included in the extracted text area. The data recognition unit 122 may recognize the data through character recognition. For example, when the data are printed characters, the data recognition unit 122 may perform the character recognition by a pattern matching method, and when the data are written characters, the data recognition unit 122 may perform the character recognition by a structure analysis method. In the exemplary embodiment, the data means a concept including characters, figures, signs, symbols, and the like.

The data combining unit 123 serves to acquire address information by combining the recognized data.

This will be described with reference to FIG. 1 again.

The user recognition unit 130 serves to recognize a user who intends to receive send the mail when the address information is not included in the collected mail.

Figure 3:
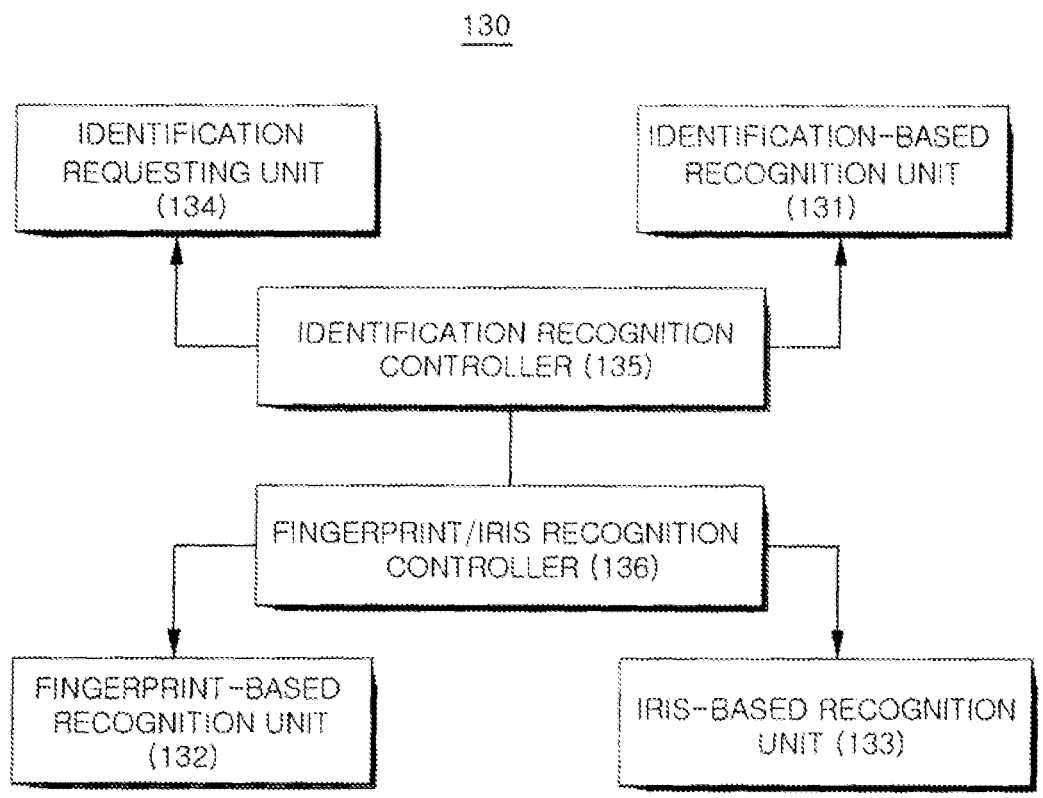
FIG. 3 is a block diagram illustrating an internal configuration of a user recognition unit illustrated in FIG. 1 in detail.

FIG. 3 is a block diagram illustrating an internal configuration of a user recognition unit illustrated in FIG. 1 in detail. Referring to FIG. 3, the user recognition unit 130 may include at least one of an identification-based recognition unit 131, a fingerprint-based recognition unit 132, and an iris-based recognition unit 133.

The identification-based recognition unit 131 includes an identification scanning unit (not illustrated) scanning the identification held by the user, and serves to recognize the user based or information acquired by scanning the identification.

The fingerprint-based recognition unit 132 serves to recognize the user based on information acquired by scanning a user's fingerprint.

The iris-based recognition unit 133 serves to recognize the user based on information acquired by scanning a user's iris.

In the case where the user recognition unit 130 includes the identification-based recognition unit 131, the user recognition unit 130 may further include an identification requesting unit 134. The identification requesting unit 134 serves to request the user to input the identification into the identification scanning unit or to position the identification on a screen of the identification scanning unit.

In the case where the user recognition unit 130 includes at least one of the fingerprint-based recognition unit 132 and the iris-based recognition unit 133 and the identification-based recognition unit 131, the user recognition unit 130 may further include an identification recognition controller 135 and a fingerprint/iris recognition controller 136.

The identification recognition controller 135 serves to perform a control to recognize the user by using the identification when the identification is input into the identification scanning unit or positioned on the screen for a predetermined stand-by time. In this case, the user recognition unit 130 may further include an identification reception determining unit determining whether the identification is input into the identification scanning unit or positioned on the screen for the stand-by time.

The fingerprint/iris recognition controller 136 serves to perform a control to recognize the user by using the user's fingerprint or iris when the identification is not input into the identification scanning unit or positioned on the screen for the stand-by time. The fingerprint/iris recognition controller 36 may perform a control to recognize the user by using the iris when the number of times attempting to recognize the user using the fingerprint exceeds a reference value.

This will be described with reference to FIG. 1 again.

The address information detecting unit 140 serves to detect address information relating to the recognized user among the stored address information. The address information detecting unit 140 may retrieve whether a person registered as a family of the recognized user exists and additionally detect address information relating to the retrieved person when the retrieved person exists.

The mail receiving unit 150 serves to receive the collected mail by an unmanned method by setting the selected address information or the acquired address information among the detected address information as address information of the addressee. The mail receiving unit 150 receives the collected mail by an unmanned method by printing the address information of the addressee on a label and attaching the label to the collected mail.

The power supply unit 160 serves to supply power to respective components configuring the apparatus 100 for receiving an unmanned mail.

The main control unit 170 serves to control the overall operation of respective components configuring the apparatus 100 for receiving an unmanned mail.

Figure 4:
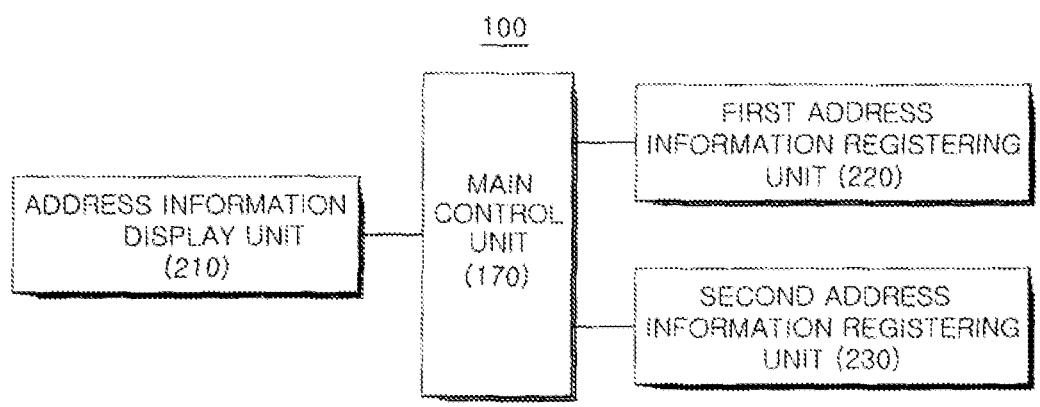
FIG. 4 is a block diagram schematically illustrating an internal configuration added to the apparatus of receiving an unmanned mail illustrated in FIG. 1.

FIG. 4 is a block diagram schematically illustrating an internal configuration added to the apparatus of receiving an unmanned mail illustrated in FIG. 1. Referring to FIG. 4, the apparatus 100 for receiving an unmanned mail may further include an address information display unit 210.

The address information display unit 210 serves to display the detected address information. The address information display unit 210 may display the detected address information according to a use frequency. For example, the address information display unit 210 may display the detected address information by varying a letter size in a higher order of the use frequency.

The apparatus 100 for receiving an unmanned mail may further include a first address information registering unit 220 or a second address information registering unit 230.

The first address information registering unit 220 includes a paper scanning unit (not illustrated) scanning a paper held by the user. The first address information registering unit 220 serves to register information acquired by scanning data printed on the paper by the paper scanning unit or written as address information relating to the user. Meanwhile, in the exemplary embodiment, the identification scanning unit and the paper scanning unit are separately described, but one scanning device may perform both identification scanning and paper scanning.

The second address information registering unit 230 includes a voice recognition unit (not illustrated) recognizing a user's voice. The second address information registering unit 230 serves to register information acquired by recognizing the user's voice by the voice recognition unit as the address information relating to the user. When the address information is registered by the first address information registering unit 220 or the second address information registering unit 230, the mail receiving unit 150 may receive the collected mail by an unmanned method by setting the address information as the address information of the addressee.

As described above, the present invention provides the apparatus 100 for receiving an unmanned mail which supports to easily input reception information including address information of the addressee by rapidly inquiring stored information based on personal information recognition. The present invention may acquire effects of enabling an inexperienced person in the use of an unmanned system to easily send the mail and of rapidly and accurately receiving the mail through the apparatus 100. Hereinafter, an unmanned receiving apparatus based on recognition information (hereinafter, abbreviated as an unmanned receiving apparatus) as an exemplary embodiment of the apparatus 100 for receiving an unmanned mail will be described.

Figure 5:
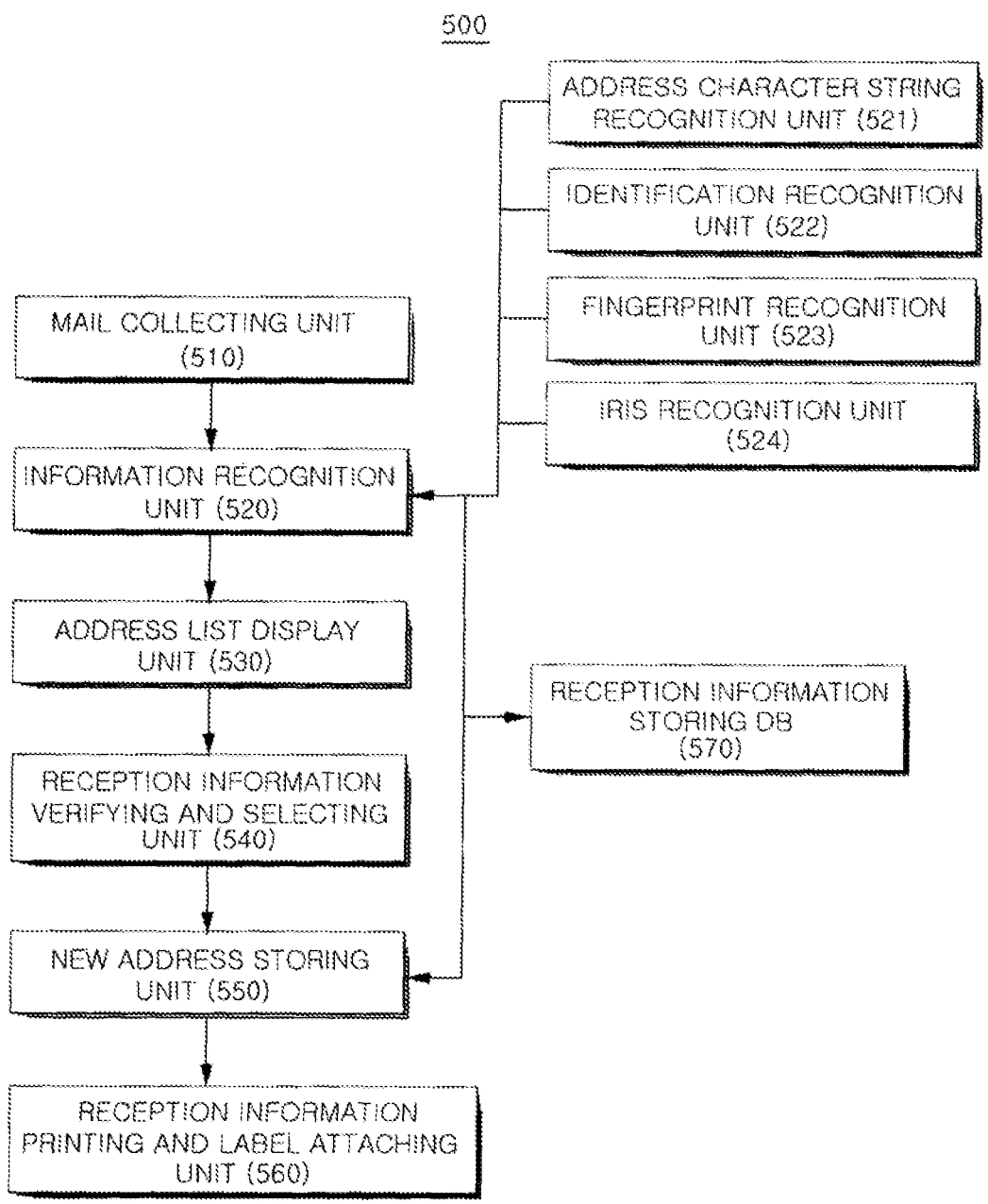
FIG. 5 is a structural diagram of an unmanned receiving apparatus based on recognition information according to an exemplary embodiment of the present invention.

FIG. 5 is a structural diagram of an unmanned receiving apparatus based on recognition information according to an exemplary embodiment of the present invention. Referring to FIG. 5, an unmanned receiving apparatus 500 includes a mail collecting unit 510, an information recognition unit 520, an address list display unit 530, a reception information verifying and selecting unit 540, a new address storing unit 550, a reception information printing and label attaching unit 560, and a reception information storing DB 570.

The mail collecting unit 510 serves to collect a mail which a user intends to receive.

The information recognition unit 520 is to automatically acquire address information. By using the information recognition unit 520, there is an effect of automatically receiving the mail when the address is written on the mail or it is difficult to input the address in an unmanned system due to inexperience use of a keyboard.

The information recognition unit 520 automatically acquires the address information by recognizing the address information written on the collected mail. When the address information is not written on the mail, the information recognition unit 520 extracts the address information from the reception information storing DB 570 in which the address information for each user is stored. The information recognition unit 520 acquires user information by various recognition methods in order to extract the address information.

The information recognition unit 520 uses identification scanning, fingerprint scanning, iris scanning, and the like as the recognition method. To this end, the information recognition unit 520 includes an identification recognition unit 522, a fingerprint recognition unit 523, an iris recognition unit 524, and the like.

The identification recognition unit 522 acquires information on a user by scanning the identification when the identification is input to the apparatus or placed on the screen by the user.

The fingerprint recognition unit 523 acquires the user information by scanning a user's fingerprint when the identification is not held.

The iris recognition unit 524 acquires the user information by scanning a user's iris. The iris scanning may be used in order to increase a recognition ratio of the user.

Address information which is often used by the user or a user's protector is stored in the reception information storing DB 570. The address information may be stored by a request of the user or the protector.

The address list display unit 530 outputs the address information registered in the name of the user or the protector in the reception information storing DB 570 when the user information is acquired.

When address information of a destination is not included in the reception information storing DB 570, the information recognition unit 520 requests a paper on which address character strings are written to be placed on the screen. When the paper is placed on the screen by the user, an address character string recognition unit 521 acquires address information from the paper. Meanwhile, the information recognition unit 520 may acquire the address information of the addressee through the voice recognition.

The reception information verifying and selecting unit 540 validates whether an error is not included in the address information selected by the user or the address information acquired from the mail.

When the address information is determined by the reception information verifying and selecting unit 540, the new address storing unit 550 compares the determined address information with the address information stored in the reception information storing DB 570. The new address storing unit 550 stores the determined address information in the reception information storing DB 570 when the determined address information is new address information.

The reception information printing and label attaching unit 560 automatically prints the address information on a label to attach the label to the mail.

A process of inputting address information of a mail destination is cumbersome and inconvenient for aged people or handicapped people. The apparatus 100 may automate the process, and the user only inputs a selection button or a verification button, and as a result, everyone may rapidly and conveniently receive the mail. Particularly, the apparatus 100 may supply a service of rapidly and conveniently receiving the mail to the aged people or the handicapped people who hardly input the address information by a keyboard input or screen touch method.

Figure 6:
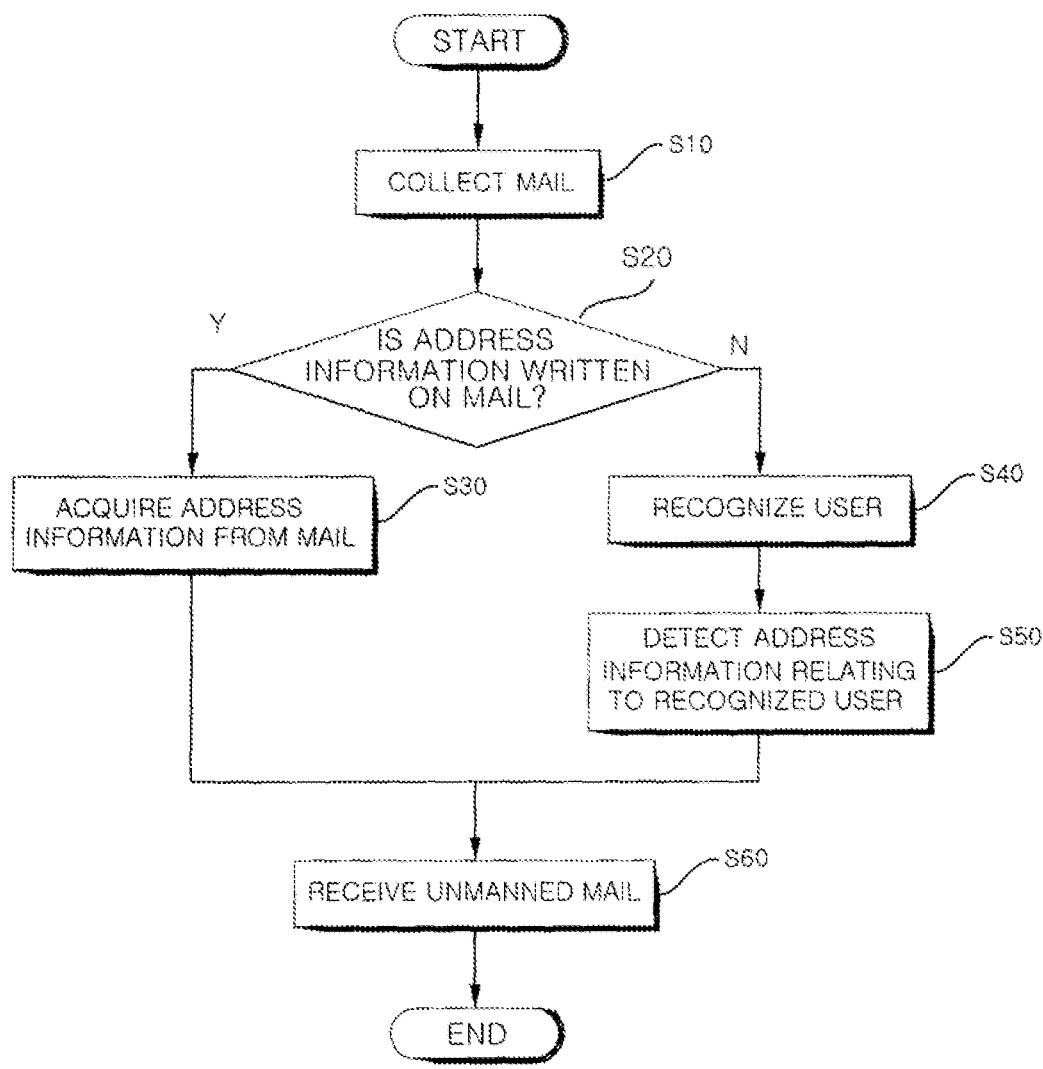
FIG. 6 is a flowchart illustrating a method for receiving an unmanned mail according to an exemplary embodiment of the present invention.

Next, a method for receiving an unmanned mail of the apparatus for receiving an unmanned mail will be described. FIG. 6 is a flowchart illustrating a method for receiving an unmanned mail according to an exemplary embodiment of the present invention. Hereinafter, the description will be made with reference to FIGS. 1 to 4, and 6.

First, the mail collecting unit 110 collects the mail (S10). When the mail is collected, the address information determining unit determines whether the address information is included in the collected mail (S20).

When the address information is included in the collected mail, the address information acquiring unit 120 acquires the address information from the collected mail (S30).

The address information acquiring unit 120 may acquire the address information through the following process. First, the address information acquiring unit 120 extracts a text area from the collected mail. Next, the address information acquiring unit 120 recognizes data included in the extracted text area. Next, the address information acquiring unit 120 acquires address information by combining the recognized data.

On the contrary, when the address information is not included in the collected mail, the user recognition unit 130 recognizes a user who intends to receive the mail (S40). In step S40, the user recognition unit 130 may recognize the user based on the information acquired by scanning the identification held by the user, or recognize the user based on the information acquired by scanning a user's fingerprint or iris.

The user recognition unit 130 may recognize the user through the following process. First, the user recognition unit 130 requests the user to input the identification held by the user into the identification scanning unit or to position the identification on a screen of the identification scanning unit. Thereafter, the user recognition unit 130 determines whether the identification is input into the identification scanning unit or positioned on the screen for a predetermined stand-by time. When the identification is unit into the identification scanning unit or positioned on the screen for the stand-by time, the user recognition unit 130 recognizes the user by using the identification. On the contrary, when the identification is not input into the identification scanning unit or positioned on the screen for the stand-by time, the user recognition unit 130 recognizes the user by using the user's fingerprint or iris. The user recognition unit 130 may recognize the user by using the iris when the number of times attempting to recognize the user using the fingerprint exceeds a reference value.

After step S40, the address information detecting unit 140 detects address information relating to the recognized user among the stored address information (S50). In step S50, the address information detecting unit 140 may retrieve whether a person registered as a family of the recognized user exists, and additionally detect address information relating to the retrieved person when the retrieved person exists.

After step S30 or after step S50, the mail receiving unit 150 receives the collected mail by an unmanned method by setting the selected address information or the acquired address information among the detected address information as address information of an addressee (S60). In step S60, the mail receiving unit 150 may receive the collected mail by an unmanned method by printing the address information of the addressee on a label and attaching the label to the collected mail.

Between step S40 and step S50, the address information display unit 210 may display the detected address information so as to be selected by the user. In this case, the address information display unit 210 may display the detected address information according to a use frequency.

The address information is registered by analyzing a voice or memo of the user, and then the mail may be received by an unmanned method by setting the registered address information as the address information of the addressee. In this case, after step S10, the first address information registering unit 220 registers information acquired by scanning data printed or written on the paper held by the user as the address information relating to the user, or the second address information registering unit 230 registers information acquired by recognizing the user's voice as the address information relating to the user.

When the address information is registered, in step S60, the mail receiving unit 150 may receive the collected mail by an unmanned method by setting the registered address information as the address information of the addressee. When the address information is registered by the first address information registering unit 220 or the second address information registering unit 230, since the address information may be set as the address information of the addressee, step S20 to step S50 may be omitted.

The present invention provides the apparatus for receiving the unmanned mail capable of automatically acquiring the address information even though the user does not directly input the address information. The apparatus provided in the present invention acquires the address information of the addressee by automatically recognizing the address of the mail when the address is written on the mail, and acquires the address information of the addressee through the paper on which the address is printed or written, identification, and biometric recognition when the address is not written on the mail. The apparatus may acquire the address information of the addressee through a mail sender's voice.

The apparatus retrieves the address DB for each user and outputs the addresses which are used frequently on the screen to allow the mail sender to select the address. The address DB for each user may pre-store the addresses according to a request of the user or the protector, or may store the corresponding address when the mail sender uses the apparatus.

Since the aged people living in the farming and fishing areas are not used to input the address through a keyboard or touch screen method, it is difficult to send the mail by using the unmanned system. The apparatus is a convenient and efficient apparatus when the aged people living in the farming and fishing areas or the handicapped people send the mail by using the manned system.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for receiving an unmanned mail, comprising:
    a mail collecting unit configured to collect a mail;
    an address information acquiring unit configured to acquire address information from the collected mail;
    a user recognition unit configured to recognize identity of a user who intends to send the mail, when the address information is not included in the collected mail;
    an address information detecting unit configured to detect address information relating to the recognized user among the stored address information; and
    a mail receiving unit configured to receive the collected mail by an unmanned method by setting the selected address information or the acquired address information among the detected address information as address information of an addressee.

2. The apparatus according to claim 1, wherein the address information acquiring unit includes:
- a text area extraction unit configured to extract a text area from the collected mail;
- a data recognition unit configured to recognize data included in the extracted text area; and
- a data combining unit configured to acquire the address information by combining the recognized data.

3. The apparatus according to claim 1, wherein the user recognition unit includes:
- an identification-based recognition unit which includes an identification scanning unit scanning the identification held by the user, and recognizes the user based on information acquired by scanning the identification;
- a fingerprint-based recognition unit which recognizes the user based on information acquired by scanning a user's fingerprint; and
- an iris-based recognition unit which recognizes the user based on information acquired by scanning a user's iris.

4. The apparatus according to claim 3, wherein the user recognition unit further includes:
- an identification requesting unit configured to request the user to input the identification into the identification scanning unit or to position the identification on a screen of the identification scanning unit;
- an identification recognition controller configured to perform a control to recognize the user by using the identification when the identification is input into the identification scanning unit or positioned on the screen for a predetermined stand-by time; and
- a fingerprint/iris recognition controller configured to perform a control to recognize the user by using the fingerprint or the iris when the identification is not input into the identification scanning unit or positioned on the screen for the stand-by time.

5. The apparatus according to claim 4, wherein the fingerprint/iris recognition controller performs a control to recognize the user by using the iris when the number of times attempting to recognize the user using the fingerprint exceeds a reference value.

6. The apparatus according to claim 1, wherein the address information detecting unit retrieves whether a person registered as a family of the recognized user exists and additionally detects address information relating to the retrieved person when the retrieved person exists.

7. The apparatus according to claim 1, further comprising:
- an address information display unit configured to display the detected address information and display the detected address information according to a use frequency.

8. The apparatus according to claim 1, further comprising:
- a first address information registering unit which includes a paper scanning unit scanning a paper held by the user and registers information acquired by scanning data printed or written on the paper as address information relating to the user; or
- a second address information registering unit which includes a voice recognition unit recognizing a voice of the user and registers information acquired by recognizing the voice as the address information relating to the user,
wherein the mail receiving unit receives the collected mail by an unmanned method by setting the registered address information as the address information of the addressee.

9. The apparatus according to claim 1, wherein the mail receiving unit receives the collected mail by an unmanned method by printing the address information of the addressee on a label and attaching the label to the collected mail.

10. A method for receiving an unmanned mail, comprising:
- a mail collecting step of collecting a mail;
- an address information acquiring step of acquiring address information from the collected mail when the address information is included in the collected mail;
- a user recognition step of recognizing identity of a user who intends to send the mail, when the address information is not included in the collected mail;
- an address information detecting step of detecting address information relating to the recognized user among the stored address information; and
- a mail receiving step of receiving the collected mail by an unmanned method by setting the selected address information or the acquired address information among the detected address information as address information of an addressee.

11. The method according to claim 10, wherein the user recognition step recognizes the user based on the information acquired by scanning the identification held by the user, or recognizes the user based on information acquired by scanning the user's fingerprint or iris.

12. The method according to claim 10, wherein the user recognition step includes:
- an identification requesting step of requesting the user to input the identification held by the user into the identification scanning unit or to position the identification on a screen of the identification scanning unit;
- an identification recognition step of recognizing the user by using the identification when the identification is input into the identification scanning unit or positioned on the screen for a predetermined stand-by time; and
- a fingerprint/iris recognition step of recognizing the user by using the fingerprint or the iris of the user when the identification is not input into the identification scanning unit or positioned on the screen for the stand-by time.

13. The method according to claim 12, wherein the fingerprint/iris recognition step recognizes the user by using the iris when the number of times attempting to recognize the user using the fingerprint exceeds a reference value.

14. The method according to claim 10, further comprising:
- an address information registering step of registering information acquired by scanning data printed or written on a paper held by the user as address information relating to the user or registering information acquired by recognizing a voice of the user as the address information relating to the user,
wherein the mail receiving step receives the collected mail by an unmanned method by setting the registered address information as the address information of the addressee.

15. The method according to claim 10, further comprising:
- an address information display step of displaying the detected address information and displaying the detected address information according to a use frequency, or
- the mail receiving step receives the collected mail by an unmanned method by printing the address information of the addressee on a label and attaching the label to the collected mail.

* * * * *